US010393245B2

(12) United States Patent
Pasquet et al.

(10) Patent No.: US 10,393,245 B2
(45) Date of Patent: Aug. 27, 2019

(54) TORQUE REDUCER

(71) Applicant: Chassis Brakes International B.V., Eindhoven (NL)

(72) Inventors: Thierry Pasquet, Vincennes (FR); Philippe Telega, Plailly (FR)

(73) Assignee: Chassis Brakes International B.V., Eindhoven (NL)

( * ) Notice: Subject to any disclaimer, the term of this patent is extended or adjusted under 35 U.S.C. 154(b) by 0 days.

(21) Appl. No.: 15/328,927

(22) PCT Filed: Jul. 20, 2015

(86) PCT No.: PCT/FR2015/051990
§ 371 (c)(1),
(2) Date: Jan. 25, 2017

(87) PCT Pub. No.: WO2016/016542
PCT Pub. Date: Feb. 4, 2016

(65) Prior Publication Data
US 2017/0219070 A1 Aug. 3, 2017

(30) Foreign Application Priority Data

Jul. 30, 2014 (FR) .................................. 14 57381

(51) Int. Cl.
*B60L 7/00* (2006.01)
*F16H 25/22* (2006.01)
(Continued)

(52) U.S. Cl.
CPC ......... *F16H 25/2252* (2013.01); *F16D 65/18* (2013.01); *F16D 2121/24* (2013.01);
(Continued)

(58) Field of Classification Search
CPC .................... F16D 2125/50; F16H 25/2252
See application file for complete search history.

(56) References Cited

U.S. PATENT DOCUMENTS 3,406,584 A    10/1968    Roantree
6,026,696 A  *  2/2000    Hehl ...................... B29C 45/07
                                                                                74/411

(Continued)

FOREIGN PATENT DOCUMENTS

DE          19637526 A1    3/1998
FR           1574976 A    7/1989
(Continued)

OTHER PUBLICATIONS

Machine translation of JP 2005-133863 (no date).*
(Continued)

*Primary Examiner* — Nicholas J Lane
(74) *Attorney, Agent, or Firm* — Harness, Dickey & Pierce, P.L.C.

(57) ABSTRACT

The reducer includes a screw, threaded internal rollers, and a tapped internal casing. The internal rollers each being in mesh firstly with the screw and secondly with the internal casing by means of at least one thread of opposite hand to a thread of the screw and of the same hand as a thread of the internal casing. The reducer further includes a tapped external casing and external rollers each in mesh firstly with the internal casing and secondly with the external casing. The external rollers are provided with at least one thread of opposite hand to a thread of the internal casing and of the same hand as a thread of the external casing.

7 Claims, 2 Drawing Sheets

Figure 1:
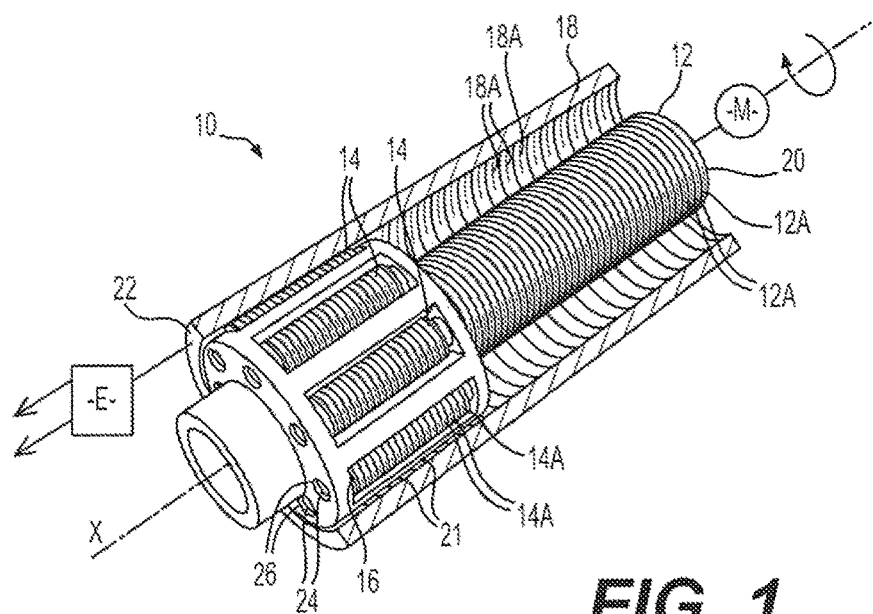

(51) Int. Cl.
*F16D 65/18* (2006.01)
*F16D 121/24* (2012.01)
*F16D 125/40* (2012.01)
*F16H 25/20* (2006.01)
*F16D 125/50* (2012.01)

(52) U.S. Cl.
CPC .... *F16D 2125/40* (2013.01); *F16D 2125/405* (2013.01); *F16D 2125/50* (2013.01); *F16H 2025/2075* (2013.01)

(56) References Cited

U.S. PATENT DOCUMENTS

| | | | | |
|---|---|---|---|---|
| 6,318,516 | B1* | 11/2001 | Zernickel | B60T 13/741 |
| | | | | 188/157 |
| 2004/0069084 | A1* | 4/2004 | Dubus | F16H 25/2252 |
| | | | | 74/424.92 |
| 2007/0249453 | A1* | 10/2007 | Sugitani | B62D 3/02 |
| | | | | 475/4 |
| 2012/0204665 | A1* | 8/2012 | Baudasse | F16H 25/2252 |
| | | | | 74/424.92 |
| 2013/0152716 | A1 | 6/2013 | Buvril et al. | |
| 2017/0276197 | A1* | 9/2017 | Yabusaki | F16D 55/226 |

FOREIGN PATENT DOCUMENTS

| | | |
|---|---|---|
| FR | 2839127 A1 | 10/2003 |
| FR | 2984443 A1 | 6/2013 |
| JP | H08-296674 A | 11/1996 |
| JP | 2005-133863 A | 5/2005 |

OTHER PUBLICATIONS

International Search Report PCT/ISA/210 for International Application No. PCT/FR2015/051990 dated Sep. 28, 2015.
Japanese Office Action dated Mar. 5, 2019 for corresponding Japanese Application No. 2017-504818.

* cited by examiner

TORQUE REDUCER

CROSS-REFERENCE TO RELATED APPLICATIONS

This application is the U.S. National Phase application of PCT Application No. PCT/FR2015/051990 filed on Jul. 20, 2015, which claims priority to French Application No. 1457381 filed on Jul. 30, 2014, the contents of each of which are incorporated herein by reference.

The invention relates to the domain of reducers and more specifically to the domain of reducers including a "satellite" or "planetary" roller screw.

Reducers incorporating a satellite roller screw, such as roller screws with recirculating rollers and other types of roller screw, notably inverted roller screws, are known.

Conventionally, a reducer provided with a roller screw includes a central screw, threaded rollers and a tapped housing containing the rollers. In a recirculating roller screw, the screw and the housing have threads that are oriented in the same direction, while the rollers have threads arranged perpendicular to the axis of the screw. For inverted roller screws, the threads of the rollers are oriented in the same direction as the threads of the screw and of the housing, but at a different helix angle.

Reducers of the type mentioned above may be used in an electromechanical braking actuator of a vehicle. However, this increases the manufacturing cost of such an actuator. Indeed, it is particularly difficult to couple a cheap electric motor to a reducer of the aforementioned type since the rotational speed of cheap motors is usually very high. Indeed, the reduction capacity of reducers in the prior art that are fitted with a roller screw is insufficient to be coupled to an electric motor with a very high rotational speed. The use of reducers in the prior art therefore requires the use of electric motors of lower speeds, the cost price of which is higher.

The present invention is intended to propose a reducer with improved reduction capacity.

For this purpose, the invention relates to a reducer comprising:
a screw,
threaded internal rollers,
a tapped internal casing, each internal roller being in mesh firstly with the screw and secondly with the internal casing by means of at least one thread oriented in the opposite direction to a thread of the screw and in the same direction as a thread of the inner casing, the reducer also comprising:
a tapped outer casing,
outer rollers each in mesh firstly with the inner casing and secondly with the outer casing, the outer rollers having at least one thread oriented in the opposite direction to a thread of the inner casing and in the same direction as a thread of the outer casing.

As such, such a reducer provides an alternative to known reduces while improving the reduction capacity of same to a reduction ratio of up to 1/180, without increasing the size of the reducer. Furthermore, the rotation of the rollers enables the casing to be driven in translation if the screw is static, or enables the screw to be driven in translation if the casing is static.

Furthermore, for this type of reducer, referred to as a two-stage reducer, orienting the threads of the outer rollers that are in mesh with the threads of the outer casing in the same direction provides an alternative to reducers comprising outer rollers in which the threads are oriented in the same direction as the threads of the inner and outer casings. Furthermore, such a reducer has improved production capacity compared to known two-stage reducers.

Advantageously, the screw and the inner casing each have a plurality of threads, preferably at least three threads.

As such, the reduction in capacity of the reducer can be further improved.

Preferably, the inner rollers mesh directly with the screw and the inner casing.

Also preferably, none of the rollers of the reducer meshes directly with any other of the rollers.

The reducer is for example designed to be controlled electrically.

This enables the reducer to overcome the drawbacks commonly found when using a hydraulic actuator.

The invention also relates to a vehicle brake actuator comprising a reducer according to the invention that is designed to actuate a service brake or a parking brake of a vehicle.

As such, the actuator provides braking for a vehicle using the reducer according to the invention. There are numerous advantages relating to use of a braking actuator provided with such a reducer. For example, the actuator no longer requires maintaining since actuators of this type are subject to very low wear. The high reduction capacity of the reducer fitted to this braking actuator enables use of a low-cost electric motor with a high rotational speed. Furthermore, braking itself only consumes a small amount of energy since it is the variation of the braking that absorbs the energy in this case. Another advantage lies in the fact that the travel of the screw in relation to the casing is relatively short, which improves the precision of the braking and enables the implementation of specific devices such as a detector on the brake pedal, or an collision-avoidance radar.

Equally, a reducer according to the invention makes it possible to compensate for the wear of the brake pads and of the disk since any play can be negated by the appropriate movement of the corresponding part of the reducer as soon as said play appears.

Advantageously, the actuator is designed to control a disk brake.

The actuator may include a floating caliper to which a brake pad is rigidly attached.

Thus, immediately after braking, the pad moves away from the disk along with the caliper, which helps to avoid any unwanted residual braking torque.

The invention also relates to a disk brake comprising an actuator driven by an electric motor, the actuator being as described above.

Finally, the inner casing, the outer casing and the screw may be made of a reinforced polymer.

Figure 2:
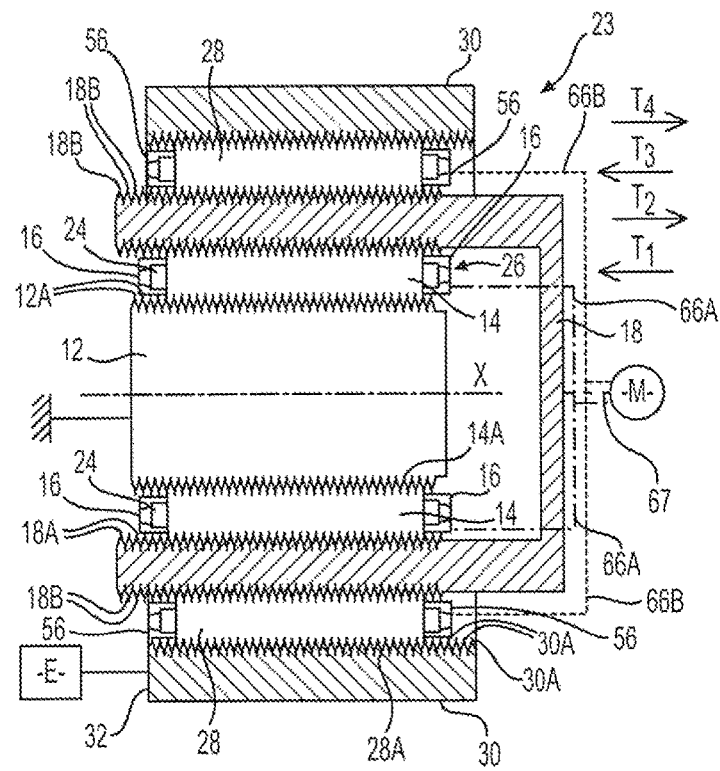
Figure 3:
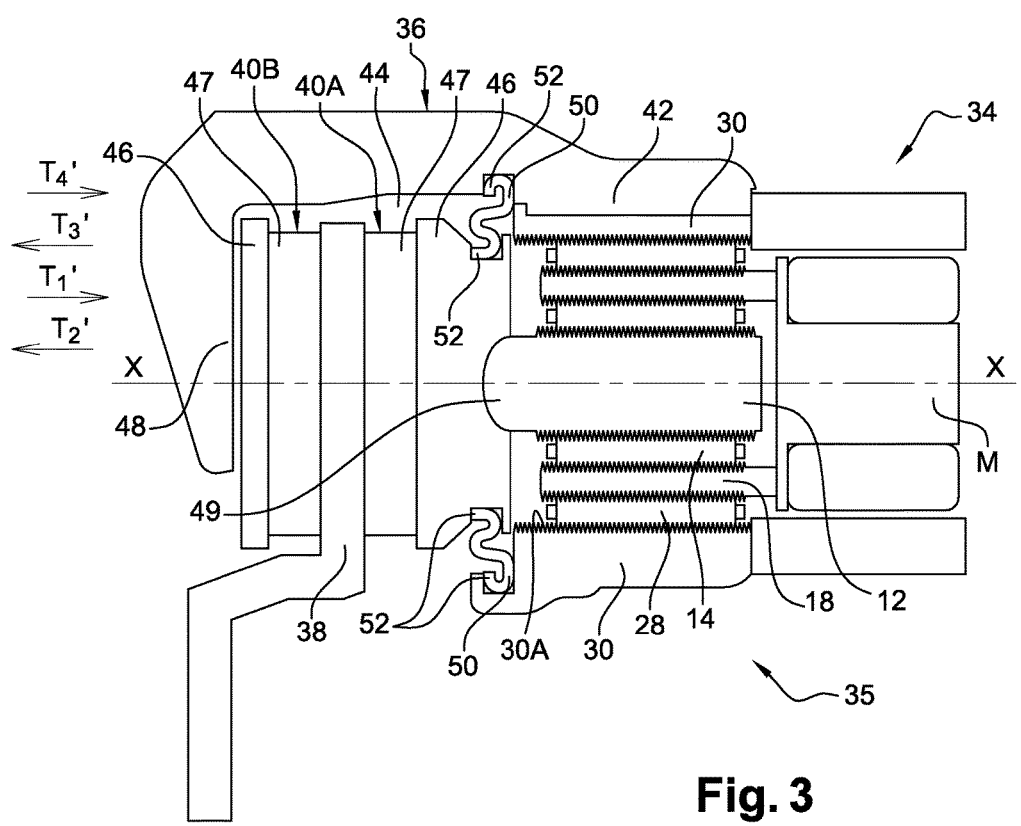

Three embodiments of the invention are described below as nonlimiting examples with reference to the attached drawings, in which:

FIG. 1 is a perspective view of an actuator forming a first embodiment of the invention, in which the casing has been cut away, FIG. 2 is a cross section of an actuator forming a second embodiment of the invention, and FIG. 3 is a cross section of a brake actuator forming a third embodiment of the invention.

With reference to FIG. 1, in the brake actuator according to the invention, the reducer 10 includes an inner screw 12, rollers 14 arranged about the screw, a roller holding cage 16 and a casing 18.

The screw 12 has three threads 12A all oriented in the same first direction. One end 20 of the screw 12 is designed to be rigidly attached to rotational drive means, such as an electric motor M of the actuator. As such, the reducer is designed to be controlled electrically. The other end of the screw has a free smooth hollow edge.

The rollers 14 are threaded and the longitudinal axis of same is parallel to the axis X of the screw. Each roller has a single thread 14A that meshes directly with the threads 12A of the screw. The thread 14A of each roller 14 is oriented in the opposite direction to the threads 12A of the screw 12.

The holding cage 16 for the rollers 14 has a cylindrical shape coaxial to the thread 12 and extends along a limited portion of the length of the screw. This cage 16 includes longitudinal seats 21 designed to receive the rollers at regular intervals about the screw. For this purpose, the seats 21 have holes 26 opening out at the ends of the cage. Positioning pins 24 are arranged at the ends of the rollers and are designed to fit into the holes 26 in the seats 21. Thus, each roller 14 is held by the ends of same in a seat 21 of the cage 16. In this example, there are ten rollers and the roller holding cage 16 has ten seats, although there could naturally be a different number of seats depending on the number of rollers used. Thus, each roller 14 is assembled movably in rotation in the respective seat 21 of same.

The casing 18 forms a cylindrical sleeve surrounding the cage 16 and arranged coaxially with the screw 12. The casing 18 has an inner wall provided with six threads 18A oriented in the same direction as the threads 14A of the rollers 14. The casing 18 meshes directly with the rollers. One end 22 of the casing 18 is designed to be rigidly attached to an element E designed to be moved in translation and thus slid in relation to the motor.

Thus, the rollers 14 each mesh directly firstly with the screw 12 and secondly with the casing 18 by means of at least one thread 14A oriented in the opposite direction to a thread 12A of the screw and in the same direction as a thread 18A of the casing 18.

Operation of the reducer 10 is described below. The reducer 10 is assumed to be driven in rotation by a shaft of a brushless electric motor M designed to turn in both directions of rotation. When the electric motor M is driven in a first direction of rotation, the screw 12 drives the rollers 14 and the cage 16 in rotation about the axis X. Since the rollers 14 are in mesh with the casing 18, the rotational movement of same generates a translational movement of the casing 18 along the axis X of the screw.

In other words, there is an axial movement along the axis X between the screw 12 and the rollers 14, between the rollers 14 and the casing 18, and between the casing 14 and the screw 12. Thus, the reducer enables the element E to be moved in translation in response to a rotational movement of the motor M. The element E is for example linked to a brake pad designed to come into contact with a disk of a disk brake.

The joint translational movement of the casing and the element E is thus significantly reduced since said movement results from a difference in the number of threads 12A, 14A, 18A between firstly the screw and the rollers and secondly the rollers and the casing, a difference in diameter between the screw and the casing, but also the inverted direction of the threads of the screw and of the rollers.

If the motor M is rotated in the opposite direction, the rotational and translational movements described above are inverted, thereby generating a translational movement of the element E in the opposite direction.

Other embodiments of the invention are described below with reference to FIGS. 2 to 3, in which the elements similar to the elements in FIG. 1 are indicated using the same reference signs.

FIG. 2 shows a second embodiment of a reducer 23, referred to as a two-stage reducer. This type of reducer 23, which is designed to be used as a brake actuator, includes elements substantially identical to the elements described above, specifically: a screw 12 with three threads 12A, rollers 14 provided with a thread 14A oriented in the opposite direction to the threads of the screw and a casing 18 provided with six inner threads 18A oriented in the same direction as the threads of the roller. In this embodiment, the rollers are referred to as inner rollers 14 and the casing is referred to as the inner casing 18. These elements are arranged in relation to one another as in the previous embodiment, with the exception of the shaft of the motor M, which is attached 67 to the inner casing 18 instead of being attached to the screw 12. Also unlike the embodiment described previously, the screw 12 is rigidly attached to a frame containing the reducer and the motor M is mounted slidingly along the axis X in relation to the frame.

The reducer also includes supplementary elements designed to increase the reduction capacity of such a reducer. In this case, these supplementary elements are threaded outer rollers 28 and an outer casing 30.

The inner rollers 14 are therefore arranged about the screw 12 while the outer rollers 28 are arranged around the periphery of the inner casing 18 and, like the inner rollers 14, are each provided with a single thread 28A. The outer rollers 28 are seated in a cage 56 in a manner substantially identical to the manner described above, the diameter being adjusted to receive the inner casing 18 and the outer rollers 28.

The outer casing 30 surrounds the cage 26 and has a cylindrical shape coaxial with the screw 12. The outer casing 30 includes six threads 30A on the inner wall of same. An element E designed to be moved in translation is rigidly attached to one end 32 of the outer casing 30, which is entirely prevented from rotating.

Each outer roller 28 meshes with the outer casing 30 and with the inner casing 18. The thread 28A of each outer roller 28 is oriented in the opposite direction to the threads 18A of the inner casing 18 and in the same direction as the threads of the outer casing 30.

Operation of the reducer 23 according to this second embodiment is described below. When the electric motor M is actuated in a first direction of rotation, the inner rollers 14, which are meshed directly with the inner casing 18, are driven in rotation about the axis X of the screw and also in rotation about themselves about their own axes. These rotational movements generate a translational movement T1 of the cage and of the rollers parallel to the axis X. Since the inner rollers 14 move in translation on the static screw 12, the inner casing 18 and the shaft of the motor M are driven by the inner rollers 14 in a translational movement T2 parallel to the axis X.

The outer rollers 28 are driven in rotation by the inner casing 18 and undergo a translational movement T3 parallel to the axis X.

Finally, the rotation of the outer rollers 28 drives the outer casing in a translational movement T4 parallel to the axis X.

A third embodiment is described below with reference to FIG. 3 in which, as in the preceding embodiments, the reducer is an electromechanical vehicle brake actuator 34 that is an integral part of a disk-brake braking device 35. Such a braking device 35 includes said actuator 34, a brake disk 38, brake pads 40A, 40B and a floating caliper 36.

The floating caliper 36 has an attachment portion 42, a disk gap 44 and a support jaw 48.

The end of the floating caliper with the attachment portion 42 is rigidly attached to the outer casing 30 of the reducer of the actuator 34. The other end of the floating caliper includes the support jaw 48 that extends parallel to the disk 38 and carries one of the pads 40B. Between the two ends of the floating caliper 36, the disk gap 42 forms a seat for the disk 38 and the pads 40A, 40B.

Conventionally, the brake pads 40A, 40B are arranged laterally on either side of the disk 38, each pad comprising a metal supporting element 46 covered with a lining 47. The inner brake pad 40A, in which the supporting element 46 is rigidly attached to one end 49 of the screw 12, is distinct from the outer pad 40B, in which the supporting element 46 is rigidly attached to the support jaw of the caliper. A deformable circular sealing gasket 50 is placed about the inner pad and links one edge of the inner brake pad to one edge of the outer casing. For this purpose, the pads, the caliper and the casing each have a seat 52 designed to receive the attachment portions of the seal. This seal is designed to entirely isolate the actuator from external contamination.

The actuator 34 includes a two-stage reducer that is substantially similar to the reducer in the second embodiment described above. The component parts are therefore arranged as before, with the exception in this embodiment that the screw 12 is designed to move in translation parallel to the axis X such that the screw forms a piston in which the end that is connected to the brake pad is designed to come into contact with the brake disk 38. In this example, the inner casing 30 driven by the motor is prevented from moving in translation.

Operation of the brake actuator 34 used in the above braking device 35 is described below.

When the electric motor M is driven in a first direction of rotation, the inner casing 18 rotates. The inner rollers 14, which are meshed directly with the inner casing 18, are driven in rotation about their own axis and about the axis X of the screw 12. The inner rollers are also moved in a translational movement T1' parallel to the axis X.

The rotation of the inner rollers 18 thus results in a translational movement T2' of the screw 12 along the axis X, in a direction referred to as the positive direction, such that the end 49 of the screw moves the inner brake pad 40A and pushes same against the brake disk 38 to generate a portion of the braking of the vehicle.

Furthermore, the rotation of the inner casing 18 drives the outer rollers 28 in rotation about their own axis and about the axis X. Moreover, the outer rollers undergo a translational movement T3' parallel to the axis X.

Finally, the rotation of the outer rollers 28 drives the outer casing 30 in a translational movement T4 parallel to the axis X, in a direction referred to as the negative direction, thereby causing a translational movement of the caliper in the negative direction. The outer pad 40B then comes into contact with the brake disk 38, thereby generating another portion of the braking of the vehicle. The disk 38 is then pressed between the two pads 40A, 40B.

When the shaft of the electric motor M turns in the other direction, the rotational and translational movements described above are inverted and the brake pads move in translation parallel to the axis X and away from the brake disk.

The invention is not limited to the embodiments disclosed and other embodiments will be clear to the person skilled in the art. Notably and as a variant of the first embodiment, the electric motor M may be connected 67 to the inner casing 18, while the screw 12 is moved in translation to move the element E.

As a variant of the second embodiment, the reducer may include a static outer casing 30, while the screw 12 is moved in translation to move the element E.

Moreover, as a variant of the second or third embodiment, the motor M need not be attached 67 to the inner casing 18, but may drive one of the two seating cages, 16, 56 for the rollers in rotation directly 66A, 66B.

Finally, the reducer according to the invention can be used in domains other than braking.

NOMENCLATURE

10: Reducer
12: Screw
12A: Screw threads
14: Rollers, inner rollers
14A: Thread of a roller, thread of an inner roller
16: Cage
18: Casing, inner casing
18A: Threads in the casing, threads in the inner casing
18B: Threads in the outer wall of the inner casing
20: End of the screw
21: Seats
22: End of the casing
23: Two-stage reducer
24: Positioning pins
26: Holes
28: Outer rollers
28A: Thread of an outer roller
30: Outer casing
30A: Threads in the outer casing
32: End of the outer casing
34: Brake actuator
35: Braking device
36: Floating caliper
38: Brake disk
40: Brake pads
42: Attachment portion
44: Disk gap
46: Supporting element
47: Lining
49: End of the screw
50: Sealing gasket
52: Seat
T1: Translational movement of the inner rollers
T2: Translational movement of the inner casing
T3: Translational movement of the outer rollers
T4: Translational movement of the outer casing
T1': Translational movement of the inner rollers
T2': Translational movement of the screw
T3': Translational movement of the outer rollers
T4': Translational movement of the outer casing
E: Element designed to be moved in translation
M: Electric motor
X: Axis of the screw

The invention claimed is:

1. A two-stage vehicle brake actuator including a reducer, the vehicle brake actuator comprising:
a motor;
a floating caliper;
a brake pad rigidly attached to the floating caliper;
a screw,
a plurality of threaded internal rollers held by an internal holding cage, a tapped inner casing,
each of the internal rollers meshing directly firstly with the screw and secondly with the inner casing by at least one thread oriented in an opposite direction to a thread of the screw and in a same direction as a thread of the inner casing,
a tapped outer casing,
a plurality of outer rollers held by an outer holding cage, each of which being in mesh firstly with the inner casing and secondly with the outer casing, the outer rollers having at least one thread oriented in an opposite direction to the thread of the inner casing and in a same direction as a thread of the outer casing;
wherein the vehicle brake actuator is configured to:
   actuate a service brake or a parking brake of a vehicle; and
   control a disk brake,
wherein the motor is configured to drive the internal holding cage or the outer holding cage directly.

2. The two-stage vehicle brake actuator according to claim 1, wherein the screw and the inner casing each have a plurality of threads.

3. The two-stage vehicle brake actuator according to claim 1, wherein the inner rollers mesh directly with the screw and the inner casing.

4. The two-stage vehicle brake actuator according to claim 1, wherein none of the internal rollers meshes directly with any other of the internal rollers.

5. The two-stage vehicle brake actuator according to claim 1, wherein the reducer is configured to be controlled electrically.

6. A disk brake including a two-stage vehicle brake actuator driven by an electric motor, the two-stage vehicle brake actuator being as claimed in claim 1.

7. The two-stage vehicle brake actuator of claim 1, wherein the plurality of threaded internal rollers comprises ten threaded internal rollers.

* * * * *